Sept. 24, 1963  G. D. BARBER  3,105,154
BLOCKING OSCILLATOR COMPARATOR
Filed Jan. 20, 1960
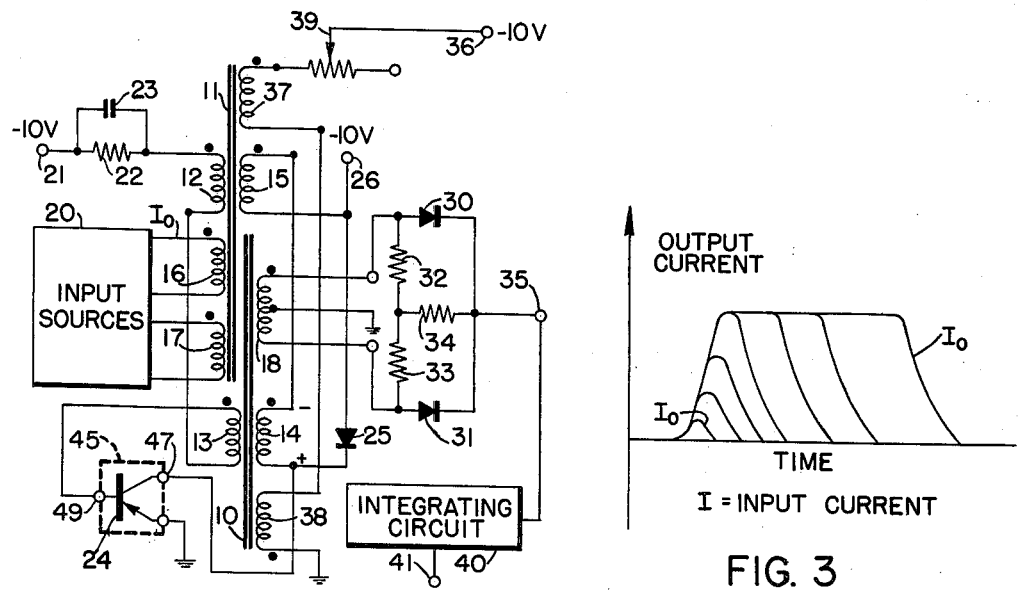
FIG. 1
FIG. 3
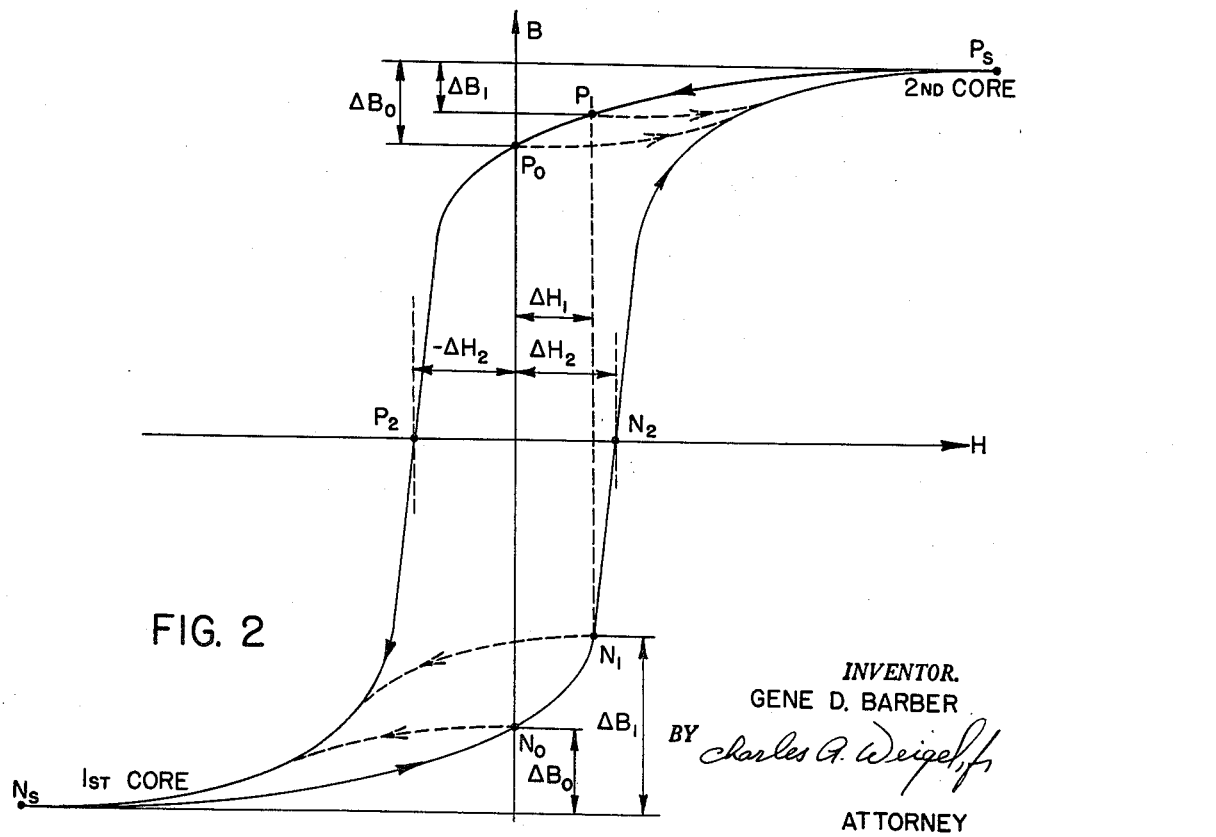
FIG. 2
INVENTOR.
GENE D. BARBER
BY Charles G. Weigel
ATTORNEY

United States Patent Office 3,105,154
Patented Sept. 24, 1963

3,105,154
BLOCKING OSCILLATOR COMPARATOR
Gene D. Barber, Escondido, Calif., assignor, by mesne assignments, to Daystrom, Incorporated, Murray Hill, N.J., a corporation of Texas
Filed Jan. 20, 1960, Ser. No. 3,672
15 Claims. (Cl. 307—88)

This invention relates to comparator devices and, more particularly, to a self-contained device utilizing magnetic cores for detecting small signals. In a preferred embodiment of this invention, the comparator device may be employed to detect deviations of an input signal or signals from a set point.

In telemetering systems, automatic control systems and the like, the system sensitivity is usually determined by the sensitivity of the input sensing devices, or transducers, which detect changes in the input electrical or physical quantities. Often, the system sensitivity is the critical factor in determining the accuracy and the utility of the system. For example, in a real time process control system, such as a refining process, small changes in temperatures, pressures, etc., must be accurately and rapidly detected. In fact, detection of thermocouple currents of less than one microampere are illustrative of the required sensitivity. Further, it is desirable that the detecting device be relatively isolated from the input electrical elements or physical quantities being sensed, have low drift, be relatively insensitive to mechanical vibration, and be capable of sampling the input signals at a relatively rapid rate.

In the past, detecting or comparing devices that have been available to industry have not been entirely satisfactory. One such comparator device, for example, is known as a pyromillivoltmeter. A pyromillivoltmeter may be used to compare a temperature, for example, as represented by a thermocouple current, to a temperature set point. A pyromillivoltmeter usually includes a galvanometer arrangement with a facility for detecting the physical position of the galvanometer's pointer. In this manner, if the galvanometer's pointer varies its position away from the set point position, an error or output signal may be generated. While such pyromillivoltmeters are in general use today, they have several disadvantages. For example, their ability to detect rapidly changing input signals is somewhat limited by the inertia of the pointer. In general, the galvanometer is not isolated from the input electrical elements being detected, and thus may impair the ability of the elements to provide an accurate indication. Also, a highly sensitive galvanometer that is not subject to drift, temperature variations, or mechanical vibration, is relatively expensive.

It is, therefore, an object of this invention to accurately compare relatively small electrical signals without the attendant limitations of prior art devices.

Another object of this invention is to detect electrical signals with relatively little effect on the electrical or physical quantities being sensed.

An additional object of this invention is to provide an improved self-contained comparator device that is more stable than those of the prior art.

Still another object of this invention is to provide an inexpensive detecting device that is capable of more rapidly responding to changes in the input signal to be detected.

In an illustrative embodiment of this invention, a comparator, or detecting device, is provided which rapidly and accurately responds to small current changes and yet is electrically isolated from and has little effect on such current changes. Specifically, this detecting device includes a pair of magnetic cores, an amplifier, and several passive elements so coupled as to form a free running blocking oscillator. The operation of the blocking oscillator is such as to produce a periodic output pulse that is variable in amplitude and polarity depending on the magnitude and polarity of an input signal or signals to be detected or compared.

The regenerative feedback circuit for the oscillator is coupled between the output and input circuits of the amplifier portion of the oscillator through a transformer which includes the two cores. Thus, when the amplifier becomes conductive during each cycle of oscillation, a magnetizing force is applied in opposite directions to each of these cores.

Input signals to be detected or compared are introduced to windings which are wound about both magnetic cores, and an output signal is derived from a winding also wound about both cores of the transformer. In the absence of an input signal, the resultant flux changes, under the influence of the magnetizing force, in the two cores during the oscillation cycle are equal and opposite in direction through the output winding. Thus, no output signal results. On the other hand, in the presence of an input signal, each of the cores is magnetically biased in the same direction (resulting in a shift of the quiescent magnetic operating points of the cores) so that the resultant flux changes in the two cores during the oscillation cycle are no longer equal and opposite through the output winding. Thus, an output pulse signal is developed across the output winding which has a magnitude and polarity related to the algebraic sum of the flux changes (and thus the input signal) in the two cores.

In alternative embodiments of the invention, several input signals may be applied to several respective input windings, in which case the output pulse signal is the algebraic sum of the several input signals. By using this alternative, one of the input signals may be a reference signal to which the other input signal or signals is to be compared.

Further advantages and features of this invention will become apparent upon consideration of the following description read in conjunction with the drawing wherein:

FIGURE 1 is a schematic wiring diagram of the comparator device of this invention;

FIGURE 2 is a hysteresis curve wherein the flux density B is plotted against the magnetic intensity H to illustrate the operating magnetic states of typical magnetic cores that may be utilized in the comparator device of this invention; and FIGURE 3 presents curves illustrating the variation of the output signal, that is available from the circuit of FIG. 1, as a function of the input signal's magnitude.

As shown in FIG. 1, the magnetic comparator device (hereinafter referred to as detector) includes first and second magnetic cores 10 and 11, respectively, which are diagrammatically depicted. Each of the cores 10 and 11 may be made of a "Permalloy" metal (78% nickel and iron), a ferrite or any other material exhibiting a magnetic hysteresis loop such as tape wound cores, or cores made of a magnetic film. The principal requirement is that the core material have a hysteresis loop of the type illustrated in FIG. 2 (in which the magnetization or flux density B, is plotted against the magnetizing force, or magnetic intensity H).

The term "hysteresis" denotes a lagging of the magnetic flux, in a magnetic material, behind the magnetizing force which is producing it, i.e., as the magnetizing force H is varied in opposite directions, the magnetic flux densities are different. The slope of the curve at any point, i.e., the ratio of an incremental change in flux to the magnetizing force H that produced such change, is known as the differential permeability of the core material. It is evident, therefore, that the differential permeability of the core material changes with the magnitude and direction of the magnetizing force that is applied to the cores 10 and 11.

In the basic detector device, each of the cores 10 and 11 has two individually wound windings and three common windings. The individual windings on the cores 10 and 11 are connected to an amplifier 45 in such manner as to form a blocking oscillator as is described below. The individual windings on the first core 10 are a feedback winding 13 and an oscillator output winding 14. The individual windings on the second core 11 are an oscillator output winding 15 and a feedback winding 12. The windings that are common to both cores 10 and 11 are first and second input signal windings 16 and 17 and an output signal winding 18.

The magnetic cores 10 and 11 and the individual windings 12 through 15, inclusive, comprise the feedback transformer of the blocking oscillator. Specifically, the transformer is coupled beween an output 47 and input 49 of the amplifier 45.

In FIG. 1, the amplifier 45 is illustrated as a PNP transistor 24 having its collector electrode connected to the output 47 and its base electrode connected to the input 49. The oscillator's output windings 14 and 15 are serially connected between a negative potential source 26 and the output 47 of the amplifier 45 (collector electrode of the transistor 24). The emitter electrode of the transistor 24 is grounded. The input 49 of the amplifier 45 (the base electrode of the transistor 24) is coupled through the serially connected feedback windings 13 and 12 to a parallel RC circuit that includes a timing capacitor 23 and a resistor 22. The RC circuit is in turn connected to the negative potential source 26 to complete the circuitry of the blocking oscillator.

In typical operation of the blocking oscillator, the emitter-base junction of the transistor 24 may be reverse-biased because of the charge acquired by the capacitor 23 from a previous cycle. As the charge on the timing capacitor 23 leaks off through the resistor 22, the biasing voltage is reduced to the point where the emitter-base junction of the transistor 24 becomes forward biased and the transistor starts to conduct. Current flow from the emitter to the collector of the transistor 24 creates a magnetic field about the oscillator output windings 14 and 15 and thus in each of the cores 10 and 11, respectively.

The dots at each winding are used in the conventional manner to indicate similar polarities. In accordance with this convention, if a current flows through one winding so that the dot end is positive, the field set up in the core induces voltages in the other windings making the dot end positive in these windings at the same time. This field in the cores 10 and 11 builds from zero to a maximum in direct relation to the collector current of the transistor, and thus induces a voltage in the feedback windings 12 and 13. With the winding polarities as denoted by the dots, this induced voltage tends to increase the forward bias of the emitter-base junction of the transistor 24 and to positively charge the timing capacitor 23. This condition maintains as long as the magnetic field in the oscillator output windings 14 and 15 is building up. Due to the regenerative feedback, the transistor 24 is very rapidly driven into saturation.

The field in the oscillator's output windings 14 and 15, and in the cores 10 and 11, continues to increase until both cores 10 and 11 are driven to conditions of negative and positive saturation, respectively. For an instant when the cores become saturated, there is no induced voltage in the feedback windings 12 and 13. Lacking the induced feedback voltage, the timing capacitor 23 begins to discharge, thereby decreasing the forward bias across the emitter-base junction of the transistor 24. This in turn decreases the collector current and the field around the oscillator output windings 14 and 15 begins to collapse. With the collapse of the field around the oscillator's output windings 14 and 15, a voltage is induced in the feedback windings 12 and 13 in a direction that tends to reverse bias the emitter-base junction of the transistor 24. This condition maintains until the transistor becomes cut off. Oscillation does not start again until the timing capacitor 23 becomes sufficiently discharged to again forward bias the emitter-base junction of the transistor.

The blocking oscillator oscillates (as was described above) at a rate determined principally by the electrical value of the timing capacitor 23 and resistor 22. With each cycle of oscillation the first core 10 is driven successively to a condition that may be designated negative saturation $N_s$ (FIG. 2) and then allowed to return to a condition that may be designated negative remnant magnetization $N_0$. Similarly, the second core 11 is driven successively to a condition that may be designated positive magnetic saturation $P_s$ and then allowed to return to a condition that may be designated positive remnant magnetization $P_0$ as will be described in detail with reference to the hysteresis loop of FIG. 2.

In the absence of input signals and after several oscillations of the transistor blocking oscillator, the hysteresis action of the first core 10 may be described with reference to FIG. 2 as from the point of negative remnant magnetization $N_0$, which lies on the negative portion of the ordinate, moving with application of a negative magnetizing force to the left and down via the dotted line until the point of negative saturation $N_s$ is reached. With the cessation of the negative magnetizing force, the magnetic condition of the first core 10 may be illustrated by the hysteresis loop beginning from negative saturation $N_s$, upward and to the right via the solid line until the core reaches its point of residual magnetization $N_0$. Since the core returns to the condition indicated by the point $N_0$ after each cycle of the blocking oscillator, the point $N_0$ is referred to as the quiescent magnetic operating point of the core. Referring again to FIG. 2, the hysteresis loop defined by the magnetic condition of the second core 11 beginning from the point of positive residual magnetization $P_0$, which lies on the positive ordinate of FIG. 2, is seen to progress upward and to the right with increasing magnetizing force H, via the dotted line, to positive saturation $P_s$. With the cessation of the magnetizing force H, the magnetic condition of the second core 11 is illustrated by the hysteresis loop of FIG. 2 which progresses downward and to the left via the solid line until the point of positive residual magnetization $P_0$ is reached. The point of positive residual magnetization is thus seen to be the quiescent magnetic operating point of the second core 11.

Note that during each cycle of oscillation flux change $\Delta B_0$ occurring in the first core 10 is the equal and opposite to the total flux change $\Delta B_0$ occurring in the second core 11. Accordingly, the algebraic sum of the flux changes, or the resultant flux, traversing the output winding 18, induces no voltage therein.

Desirably, the parameters of the various components are selected to allow the magnetic cores 10 and 11 to saturate before the transistor is turned off by the increasing voltage being developed across the timing condenser 23. The interpulse interval, as noted above, is substantially determined by the discharge time of the capacitor 23, which illustratively may be one millisecond, whereas the pulse duration is determined by the time required to saturate both cores.

As a safety feature, the collector electrode of the transistor 24 is coupled through a normally reverse-biased diode 25, which shunts potentials in excess of 10 volts, that may be coupled back across the transformer arrangement around the oscillator output windings 14 and 15. The diode 25 functions therefore as a protective device for the transistor 24 by preventing the collector potential from going below —10 volts for the circuit parameters illustrated.

In the absence of input signals, although the oscillator continues to oscillate, each of the cores is driven from its quiescent operating point ($N_0$ or $P_0$ in FIG. 2) to saturation and then allowed to return to its quiescent operating point. During this change, the total change in magnetization is represented in FIG. 2 by $\Delta B_0$. It may be noted that no output signal appears across the output winding 18. This is true because the output signal winding 18 is wound about both the cores 10 and 11, and the changes in flux in each of the cores 10 and 11 are equal in magnitude and opposite in direction, i.e., when the flux in the first core 10 is changing in one direction, the flux in the second core 11 is changing in the opposite direction by the same amount. The equal and opposite changes in flux in the cores 10 and 11 result in no output signal in the winding 18.

If now a small current is passed through either of the input windings 16 or 17 from the input sources 20, then both cores 10 and 11 simultaneously become magnetically biased in the same direction and by the same amount (illustrated as a positive magnetizing force $\Delta H$, FIG. 2). It is apparent, therefore, that the application of an input signal to either of the windings 16 or 17 causes the remnant magnetic condition, or quiescent magnetic operating point, of the cores to change by an amount and in a sense determined by the magnitude and polarity of the input signal. Thus, for an input signal of one polarity such as to cause both cores 10 and 11 to be affected by a positive magnetizing force $+\Delta H_1$, the quiescent operating point of each of the cores is shifted to the right (FIG. 2). The quiescent magnetic operating point of the first core 10 is shifted upward and to the right along the hysteresis curve to the point $N_1$. In similar manner, the quiescent magnetic operating point of the second core, is shifted upward and to the right along the hysteresis curve to the point $P_1$. Note that with this biasing, the quiescent operating point of the first core 10 moves farther away from negative saturation whereas that of the second core 11 moves closer to positive saturation.

Now, as the blocking oscillator cycles, the first and second cores 10 and 11 are driven successively to their respective states of negative and positive saturation and then allowed to return to the new quiescent operating points $N_1$ and $P_1$, respectively. The hysteresis paths followed by the respective cores are illustrated in FIG. 2. Thus, the magnetic condition of the first core 10, for example, is illustrated as progressing from its quiescent operating point $N_1$, downward and to the left under the influence of a negative magnetizing force as shown by the dotted line to negative saturation $N_s$, thence upward and to the right along the lower solid line to its quiescent operating point $N_1$. Similarly, the magnetization of the second core 11 is illustrated graphically as progressing from its quiescent operating point $P_1$ upward and to the right, under the influence of a positive magnetizing force shown by the dotted line, to positive saturation $P_s$, thence downward and to the left along the lower solid line to its quiescent operating point $P_1$.

Since, as noted above, the second core was closer to saturation than the first core with each cycle of oscillation of the oscillator, the flux change occurring in the respective cores, while in opposite directions, is of different magnitude. Specifically, the flux change occurring in the first core 10 (illustrated as $\Delta B_1$, in FIG. 2) is far larger than the flux change occurring in the second core 11 (also illustrated as $\Delta B_1$ in FIG. 2). This means that each such cycle develops a resultant flux change that links the output signal winding 18. This resultant flux change induces an output voltage in the output signal winding 18 that varies in magnitude and polarity with the magnitude and polarity of the input signal.

The comparator may be utilized to detect algebraically the sum of two or more input signal currents or to compare one or more input signals to a reference level signal. For example, a current of one polarity may be introduced to the winding 16 and a current of a different polarity may be introduced to the second winding 17. If the two control currents are equal in magnitude, the magnetizing force established by each cancels each other so that the quiescent operating points of the cores 10 and 11 remain the same and no recurring output signal results. If either of the two signals is larger than the other, the difference in magnitude is detected due to the change in quiescent operating points and thus in the flux of the cores 10 and 11. The resulting output signal is a recurring signal, occurring with each cycle of oscillation of the blocking oscillator, and is positive or negative depending upon the polarity and magnitude of the several input signals.

Though provision for only two input currents is illustrated, any larger number may be provided. Also, the several input signals may be scaled by providing different turn ratios on the input windings so that isolated input signals of different magnitudes may be compared to ascertain if a predetermined ratio exists between their magnitudes.

For example, if a 10 milliampere and a 3 milliampere input signal are to be compared, the 3 milliampere signal may be applied to a winding having 10 turns and the 10 milliampere signal to a winding having 3 turns. So long as this ratio maintains between the input signals, no recurring output signals result. If this ratio varies, either a series of positive or negative pulses will result depending on the direction and magnitude of the variation.

The potential $e$ generated across the output signal winding 18 is proportional to the rate of change of flux $d\phi/dt$, where $e$ is the output potential, $d\phi$ is the change in flux, and $dt$ is this time interval during which the change takes place. The larger the magnitude of the input currents, the larger is the difference between the flux changes occurring in the cores 10 and 11, and thus the larger is the output pulse. However, due to the non-linearity of the two curves which form the hysteresis loop, the magnitude of the generated output pulses does not necessarily vary linearly with the magnitude of the input current. In fact, a point is reached beyond which the output pulse's magnitude ceases to increase further due to saturation of the cores.

However, the product of the output pulse's magnitude multiplied by its duration ($edt$) varies more linearly with the variations of the magnitude of the input current. The mathematical relationships are as follows:

The product ($edt$) is proportional to $d\phi$, where the symbols are as identified above. But $\phi$ is proportional to $\mu H$ which in turn is proportional to $I$, with $\mu$ being the permeability, $H$ the magnetic intensity and $I$ the current through the oscillator's input windings 16 and/or 17.

The linearity of the relationship ($edt$), therefore, is dependent upon the changes in the composite, or effective, permeability of both cores 10 and 11 during the operating cycle of the sensing device. Assuming that the composite permeability is constant, the product of the magnitude of the output pulse times its duration ($edt$) varies linearly with the magnitude of the input current applied to the windings 16 and 17. Thus, if the output pulse is integrated, the integrated pulse amplitude is proportional to the input signal current over a predetermined range of currents.

The output signal, as illustrated in FIG. 3, has a somewhat triangular shape for small input signals to windings 16 and/or 17, and for larger signals a somewhat trapezoidal shape which increases in duration with further increases in the input current applied to the input windings 16 or 17.

The sensitivity of the device depends in part upon the differential permeability $d\mu$ which is defined as the incremental change in flux created by an incremental change in magnetizing force. It may be noted from this definition that the differential permeability is determined by the slope of the hysteresis loop at the quiescent operating point of the core. Thus, the sensitivity of the comparator may be varied by means of the bias windings (37 on the second core 11 and 38 on the first core 10). These windings are serially connected between ground and a rheostat 39, and function to shift the quiescent operating points of the respective cores 10 and 11. To obtain maximum sensitivity, the rheostat 39, which is connected to a negative potential source 36, is adjusted to apply a magnetizing force sufficient to shift the quiescent operating point of each of the cores to that point on the hysteresis loop having the greatest differential permeability. Thus, to shift the first core 10 from its point of remnant magnetization $N_0$ to a new quiescent operating point $N_2$, at which the differential permeability is the greatest, it is necessary to apply a positive going magnetizing force illustrated as $+\Delta H_2$. To shift the quiescent operating point of the second core 11 in the opposite direction from its point of remnant magnetization $P_0$ to the point on the core at which the differential permeability is the greatest, it is necessary to apply a negative going magnetizing force illustrated as $-\Delta H_2$. As noted above, the slope of the curves of the hysteresis loop is steeper at these points of maximum differential permeability $P_2$ and $N_2$ than at the points of remnant magnetization $P_0$ and $N_0$. Thus, a smaller input signal is required to produce the same amplitude output pulse if the cores are biased to operate at the points of maximum differential permeability.

Note that with these latter named quiescent operating points $N_2$, $P_2$, in the absence of an input current, no voltage is developed across the output 18 because the changes in flux density remain equal and opposite. When an input current is introduced, however, the quiescent points are shifted in the same direction in each core such that a difference flux density develops in the output winding 18 as described above.

The signal developed across the output signal winding 18 may be rectified by a full wave rectifier including the diodes 30 and 31 which are connected to opposite ends of the output signal winding 18. The center terminal of the winding 18 may be grounded, and its end terminals connected to resistors 32 and 33, respectively, as well as to diodes 30 and 31. The junction between the resistors 32 and 33 may be connected through a resistor 34 to an output terminal 35. With such connections the signals appearing at the output terminal 35 are positive pulses with respect to ground and are independent of the relationship between the input signals introduced through the input windings 16 and 17. The polarity of the pulse across the output winding 18 depends upon the algebraic sum of the two input signals, whereas due to the rectification, the output pulses at the terminal 35 are always positive.

This output arrangement is only one of several which have been used. For example, diodes 30 and 31 can be reversed if negative pulses are desired. Another arrangement involves the elimination of parts 30 through 34 and the use of a single resistor across the output winding 18 which may have a center tap or either end grounded. In this configuration, the circuit operates so that output pulses will change in both magnitude and polarity in response to the input sources.

The pulses at the output terminal 35 may be introduced to an integrating circuit 40 which converts them to pulses having an amplitude which is proportional to the product of the magnitude and time duration of the pulses at the output terminal 35. In other words, the pulses at the output terminal 41 have a magnitude which varies substantially linearly with the algebraic sum of the input currents to the windings 16 and 17. Other output arrangements may also be used. Instead of an integrator 40, pulses at the output terminal 35 may be applied to a variety of circuits including bistable and monostable multi- vibrators and blocking oscillators to gain power amplification.

In typical operation power consumption is approximately 20 milliwatts, the cores 10 and 11 are Permalloy and the repetition rate is 1000 cycles per second. The sensing device has a very high sensitivity, particularly if operated at the points of maximum differential permeability $P_2$, $N_2$ (FIG. 2). Also, due to the transformer action, the output is isolated and may provide an inverted signal if desired simply by reversing the output winding.

Although this invention has been disclosed and illustrated with reference to particular operational parameters, the novel concept is susceptible of embodiment in numerous other equivalent forms which will be apparent to persons skilled in the art. For example, a grounded base transistor arrangement could be utilized as well as the grounded emitter arrangement illustrated. Vacuum tubes could be used for the amplifier 45 instead of transistors. Of course, in using hard tubes the values of the several sources of potential would be changed to provide the appropriate voltage therefor. Also, a variety of core materials could be used and a single winding could be used (for example, input winding 16) for both input and output.

There has thus been described a simple, relatively inexpensive device in which the transformer action isolates the input signals from the comparator device. Also the input signals may be inverted or scaled as desired merely by varying the winding direction or number of turns. The comparator device is solid state, has no moving parts, and has low drift. The sampling rate may be made quite rapid by variation of the R–C network 22—23, and may be varied or triggered to operate synchronously if desired. Further, the comparator device is a self-contained unit which includes a blocking oscillator necessary to drive the device. Also, by varying the quiescent operating point of the cores, the comparator device may be made to operate at a point of lesser or greater differential permeability such that relative small signals may be relatively accurately compared or detected.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A blocking oscillator circuit for detecting an input signal, said oscillator circuit including a pair of magnetic cores; means responsive to the output of said oscillator circuit for varying the magnetic flux in each of said cores in opposite senses; means responsive to said input signal for magnetically biasing each of said cores in the same sense; and means mutually linking said cores and being responsive to the resultant magnetic flux change in both of said cores thereby to develop successive output pulses each related to the instantaneous magnitude of said input signal whereby said input signal is successively detected at the repetition rate of said blocking oscillator circuit.

2. A blocking oscillator circuit for detecting an input signal, said oscillator circuit including a transformer having a pair of saturable magnetic cores, means responsive to the output of said oscillator circuit for varying the magnetic flux in each of said cores in opposite senses, means responsive to said input signal for magnetically biasing each of said cores in the same sense, means responsive to the resultant magnetic flux change in each of said cores thereby to provide successive pulses each related to the instantaneous magnitude and polarity of said input signal, and means for varying the quiescent magnetic operating point of each of said cores in opposite senses, thereby to improve the sensitivity of the blocking oscillator circuit.

3. A circuit for comparing a first and a second input signal comprising, in combination: a blocking oscillator, the regenerative feedback portion of said oscillator including a pair of magnetic cores; means responsive to each of said input signals for simultaneously magnetically biasing each of said cores; means responsive to said blocking oscillator for periodically varying the magnetic flux in each of said cores in opposite directions; and means responsive to the algebraic sum of the magnetic flux changes in each of said cores for providing a periodic output signal proportional to the instantaneous algebraic sum of said first and said second input signals.

4. The circuit set forth in claim 3 wherein each of said magnetic cores is saturable and wherein said means responsive to said blocking oscillator operates to periodically magnetically saturate each of said cores in opposite directions.

5. The circuit set forth in claim 3 which includes additional means associated with each of said magnetic cores for magnetically biasing said cores to a quiescent operating point of zero flux density, whereby the sensitivity of said circuit to changes in said input signals is increased.

6. A blocking oscillator circuit for detecting the magnitude and polarity in an input current, the regenerative feedback portion of said circuit including: a transformer having a first and a second saturable magnetic core; means responsive to said input signal for establishing a magnetic flux in said first core in one direction; means responsive to said input signal for establishing a magnetic flux in said second core in said one direction; means responsive to the output of said blocking oscillator circuit for periodically varying the magnetic flux in said first core in said one direction; means responsive to the output of said blocking oscillator circuit for periodically varying the magnetic flux in said second core in a direction opposite said one direction; and output means associated with each of said cores for providing output pulses proportional to the algebraic sum of the magnetic flux changes in said cores; whereby the magnitude and polarity of said periodic output signal is a function of the magnitude and polarity of said input signal.

7. Apparatus for detecting small changes in an input signal, said apparatus including a blocking oscillator having an amplifying element and a feedback circuit coupled across said amplifying element to render said amplifying element successively conductive and non-conductive, said feedback circuit including a pair of saturable cores, and means coupling each of said pair of cores across said amplifying element so that the flux conditions in each one of said cores changes in an opposite sense with respect to the other as said amplifying element becomes successively conductive and non-conductive, an output winding coupled to both of said cores whereby changes in flux in said cores induce potentials across said output winding which cancel each other in the absence of an input signal, and an input winding coupled to receive said input signal and common to each of said cores for establishing a magnetic flux in the same sense in each of said cores in accordance with said input signal, whereby the flux conditions of said cores change by different amounts as said amplifying element becomes successively conductive and non-conductive, thereby inducing a potential across said output winding in accordance with said input signal.

8. Apparatus for detecting small changes in an input current, said apparatus including a blocking oscillator having an amplifying element and a feedback circuit coupled across said amplifying element in such manner as to render said amplifying element successively conductive and non-conductive; said circuit including a pair of saturable magnetic cores, means coupling each one of said cores across said amplifying element so that the flux conditions in each one of said cores changes in an opposite direction with respect to the other when said amplifying element becomes successively conductive and non-conductive; an input winding coupled to each of said cores for receiving said input current and for adjusting the flux conditions of each of said cores in the same direction in accordance therewith; an output winding coupled to both of said pair of cores whereby changes in flux in said cores induce potentials across said output winding which cancel each other in the absence of an input current; a bias winding on each of said pair of cores for introducing predetermined fluxes in opposite directions in each of said cores whereby to increase the differential permeability thereof, and a direct current source coupled to said bias windings on said pair of cores for introducing a predetermined current thereto to establish said predetermined fluxes, whereby the sensitivity of said apparatus to said input current is increased.

9. A circuit including a blocking oscillator for comparing a first input signal to a second input signal, said circuit including an amplifying element having an input and an output terminal; a feedback arrangement including a pair of saturable magnetic cores coupled between said input and said output terminals for promoting regeneration, and means coupling said cores between said output and said input terminals of said amplifying element, whereby the magnetic conditions of said cores change in opposite senses in accordance with changes in the conductive condition of said amplifying element; a first input winding wound about both of said cores for receiving said first input signal and adjusting the flux conditions of said cores in the same sense by amounts related thereto; a second input winding wound about both of said cores for receiving said second input signal and adjusting the flux condition of said cores in the same sense by amounts related thereto, and an output winding wound about both of said cores and being responsive to the algebraic sum of the flux changes in said cores due to changes in the conductive condition of said amplifying element for providing a pulse output signal whose amplitude-time product varies in accordance with the relative magnitude of said first input signal with respect to said second input signal.

10. The comparator set forth in claim 9 which also includes an integrating circuit coupled to said output winding to provide an integrated pulsed output signal whose output has an amplitude that varies substantially linearly in accordance with the algebraic sum of said input signals.

11. Apparatus for detecting small changes of an input signal including two saturable magnetic cores, a common input winding wound in the same direction about both of said cores for receiving the input signal, a pair of windings individual to each of said cores, a common output winding wound in the same direction about both of said cores, a transistor having emitter, base and collector electrodes, means coupled to one of said individual windings of each of said cores for connecting each of said one windings in series with each other and with said collector electrode of said transistor, means coupled to the other one of each of said individual windings of each of said cores for connecting said other windings in series with each other and with said base electrode of said transistor, said last named means also including a capacitor coupled in series with said other windings, and biasing means coupled to said emitter electrode and to each of said series coupling means for normally causing conduction in said transistor, whereby changes in collector current change the flux conditions of said cores in opposite directions with respect to said output winding.

12. The apparatus set forth in claim 11 wherein said common output winding provides output pulses as a result of said collector current changes whose amplitude-time product varies substantially linearly with said input signal.

13. A comparator including a blocking oscillator for comparing a first input signal to a second input signal comprising, in combination: an amplifying element having an input and an output terminal; a regenerative feedback arrangement including a pair of saturable cores coupled between said input and said output terminals; and means coupling said cores between said input terminal and said output terminal of said amplifying element whereby the magnetic conditions of said cores change in accordance with changes in the conductive condition of said amplifying element; a first and a second input winding each wound about both of said cores for individually receiving said first and said second input signals for adjusting the quiescent magnetic operating points of said cores in the same direction by amounts related to the algebraic sum of said input signals; and a common output winding wound about both of said cores.

14. A blocking oscillator for detecting an input current including two similar magnetic cores, an amplifying element, means coupled to each of said cores and to said amplifying element so that changes in current through said amplifying element change the magnetic conditions of said cores, an output winding coupled to each of said cores so that the changes in flux in either of said cores develop opposite polarity pulses across said output winding, and an input winding responsive to the input current and coupled to each of said cores for adjusting the quiescent magnetic operating points of said cores in the same direction with respect to said output winding by an amount related to the magnitude of the input current.

15. Apparatus for converting the magnitude of an electrical signal to pulses having a magnitude proportional to the instantaneous magnitude of the electrical signal, said apparatus comprising a blocking oscillator having a feedback circuit including two saturable cores, means for changing the flux conditions of said cores in opposite directions during each cycle of the operation of said blocking oscillator, means for biasing said saturable cores in the same direction in accordance with the magnitude of the electrical signal, and an output circuit coupled to both of said cores so that a potential is induced thereacross which is related to the algebraic sum of the flux changes in said cores.

References Cited in the file of this patent

UNITED STATES PATENTS

| | | |
|---|---|---|
| 2,695,993 | Haynes | Nov. 30, 1954 |
| 2,740,086 | Evans | Mar. 27, 1956 |
| 2,828,477 | Lanning | Mar. 25, 1958 |
| 2,858,438 | Merrill | Oct. 28, 1958 |
| 2,978,614 | Bauman | Apr. 4, 1961 |